United States Patent Office 3,227,693
Patented Jan. 4, 1966

3,227,693
PROCESS FOR VULCANIZING RUBBERY POLYMERS
Herbert Sargent, Garden Grove, Calif., assignor to Richfield Oil Corporation, Los Angeles, Calif., a corporation of Delaware
No Drawing. Filed Mar. 19, 1962, Ser. No. 180,863
13 Claims. (Cl. 260—78.4)

This invention relates to improvements in the vulcanization of rubber. More specifically, the invention relates to a non-sulfur vulcanization of natural or synthetic rubbery polymers with a non vulcanizing adduct which releases a vulcanizing agent when heated to vulcanization temperatures.

It is known that maleic anhydride reacts with natural or synthetic rubber in such a manner that a vulcanization or cross-linking reaction between adjacent chains occurs. However, when maleic anhydride is added to the raw rubbery polymer the reaction proceeds so rapidly, even at ambient or room temperatures, that cross-linking occurs before uniform mixing can be accomplished, and, therefore, has no practical commercial use. Further, maleic anhydride is not soluble in the raw rubbery polymer.

In accordance with this invention, a method is disclosed whereby a vulcanizing agent such as maleic anhydride may be reacted with a raw rubbery polymer in such a manner that uniform mixing of the rubbery polymer with the vulcanizing agent in nonreactive form is possible and a homogeneous vulcanizate thereby produced.

This invention comprises the use of oil-soluble, non vulcanizing adducts such as the Diels-Alder adducts of maleic anhydride, as novel vulcanizing agents. The adducts are of such stability that they dissociate upon heating to liberate maleic anhydride.

The adducts that may be employed successfully in accordance with the present invention have the following general formulas:

(I) 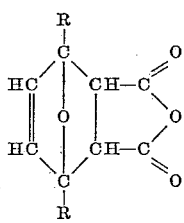

(II) 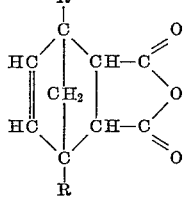

wherein R represents H or a lower alkyl group.

The adducts represented by the above formulas I and II may be prepared by the well known Diels-Alder reaction by condensing equimolar proportions of maleic anhydride with, for example, furan, alpha-methylfuran, cyclopentadiene, etc. Typical adducts represented by the above formulas are:

3,6-endomethylene-$\Delta^4$-tetrahydrophthalic anhydride
3,6-endoxy-$\Delta^4$-tetrahydrophthalic anhydride
3,6-endoxy-3-methyl-$\Delta^4$-tetrahydrophthalic anhydride, etc.

As previously stated, the adducts to be used as vulcanizing agents in the method of this invention dissociate upon heating to vulcanization temperatures to liberate maleic anhydride in situ. Therefore, the adducts are mixed or milled with the rubbery polymers at room temperatures. This may be successfully accomplished by dissolving the rubbery polymer in a suitable solvent such as benzene and mixing the adduct therein. The mixture is dried at room temperature and the adduct and polymer are obtained as a dry solid mixture.

The dry solids and other desired ingredients added to the mixture such as inhibitors, etc. are then vulcanized at elevated temperatures according to the conventional practice for the particular rubbery polymer used. Generally, temperatures of about 50 to 200° C., preferably 75 to 150° C. are sufficient. Care should be taken to prevent removal of the added ingredients such as inhibitors since maleic anhydride has a tendency to remove natural inhibitors. This can be avoided by excluding oxygen during the vulcanization step. The vulcanizate becomes swollen by the solvent but is not soluble in it.

Various polymers may be vulcanized with the vulcanizers of this invention. Natural and synthetic rubbers can be vulcanized with the aforementioned adducts. Generally, many of the olefinic type polymers, copolymers and mixtures thereof can be vulcanized according to this invention, e.g. polybutadienes, polyisoprene, butadiene acrylonitrile, styrene butadiene, vinyl pyridine butadiene, etc.

The amount of vulcanizing agent used in the process of the invention is variable depending on the particular rubbery polymer to be vulcanized. Generally, however, it should be recognized that an amount of the vulcanizing agent less than that which is stoichiometrically required to react with all of the rubber is sufficient to vulcanize or improve the properties of the raw rubber since even a small amount of reaction with the vulcanizing agent will serve to prevent slippage between adjacent chains of the rubbery polymer. Accordingly, any amount of vulcanizing agent in excess of about 0.1% by weight of the raw polymer is sufficient to improve the properties of the vulcanizate although normally from about 1–10% of vulcanizing agent is used. By "vulcanizing amount" is meant an amount sufficient to improve the properties of the rubbery polymer.

The novel vulcanization process of the present invention has the particular advantage of being odorless. In the conventional sulfur vulcanization processes the sulfur odor is objectionable. In addition, the instant process results in a vulcanizate which possesses improved oil resistance. The carboxylic acid groups introduced by the maleic anhydride are hydrophilic whereas the sulfur linkages of conventional vulcanizates are hydrophobic.

The following examples illustrate the invention. All parts are by weight.

*Example I*

The Diels-Alder adduct, 3,6-endoxy-3-methyl-$\Delta^4$-tetrahydrophthalic anhydride, was prepared by reacting equimolar quantities of alpha-methyl furan and maleic anhydride. Thus, 272 grams of maleic anhydride and 228 grams of alpha-methyl furan were mixed with 500 grams of ether in a 2-liter erlenmeyer flask. The reaction proceeded immediately upon seeding with crystals of 3,6-endoxy-3-methyl-$\Delta^4$-tetrahydrophthalic anhydride. The product was recovered from the ether solvent and crystallized from acetone and water.

*Example II*

The Diels-Alder adduct, 3,6-endoxy-$\Delta^4$-tetrahydrophthalic anhydride, was prepared by a procedure similarly as the adduct was prepared in Example I from equimolar quantities of maleic anhydride and furan.

Example III

The Diels-Alder adduct, endomethylene-Δ⁴-tetrahydrophthalic anhydride, was prepared by a procedure similarly as the adduct was prepared in Example I from equimolar quantities of maleic anhydride and cyclopentadiene.

Examples IV–VI

A natural rubber solution (20% by weight rubber) was diluted with benzene to produce a 5% by weight rubber solution. Each of the adducts prepared in Examples I, II and III were added to separate equal quantities of the above rubber solution. The adducts were added in amounts to form a 5% by weight mixture based on the rubber solids in solution. Each of the mixtures were dried at room temperatures in Petri dishes. The dry solids contained in each of the Petri dishes were then heated to 100° C. The dried solids were wrapped in foil prior to the heating step to exclude oxygen during the vulcanization reaction. The products in each instance were vulcanized as evidenced by the fact that they were insoluble in benzene.

Although the present invention has been described with a certain degree of particularity, it is to be understood that the scope of my invention is not to be limited by the details set forth but should be afforded the full scope of the appended claims.

What is claimed is:

1. A process for vulcanizing a rubbery polymer vulcanizable with maleic anhydride at ambient temperatures which comprises blending a vulcanizing amount of a rubber soluble non-vulcanizing Diels-Alder adduct of maleic anhydride which when heated yields maleic anhydride, with said rubbery polymer, and thereafter heating said blend to temperatures at which said adduct yields maleic anhydride.

2. A process for vulcanizing a rubbery polymer vulcanizable with free maleic anhydride at temperatures as low as room temperature which comprises mixing a vulcanizing amount of an oil soluble Diels-Alder adduct of maleic anhydride, said adduct being non-reactive with said rubbery polymer at room temperature and capable of yielding a vulcanizing agent when heated with said rubbery polymer, and thereafter heating said mixture to vulcanization temperatures.

3. The process of claim 2 wherein said rubbery polymer is natural rubber.

4. The process of claim 2 wherein said rubbery polymer is a synthetic rubbery polymer.

5. A process of vulcanizing a rubbery polymer vulcanizable with maleic anhydride at ambient temperatures which comprises mixing a vulcanizing amount of a Diels-Alder adduct selected from the group consisting of:

(I) 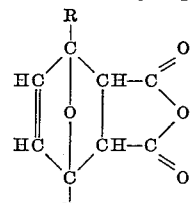

(II) 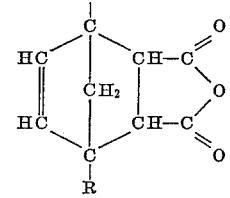

wherein R represents H or a lower alkyl group, with a rubbery polymer, and thereafter heating said mixture to vulcanization temperatures.

6. The process of claim 5 wherein said anhydride is 3,6-endomethylene-Δ⁴-tetrahydrophthalic anhydride.

7. The process of claim 5 wherein said anhydride is 3,6-endoxy-Δ⁴-tetrahydrophthalic anhydride.

8. The process of claim 5 wherein said anhydride is 3,6-endoxy-3-methyl-Δ⁴-tetrahydrophthalic anhydride.

9. The process of claim 5 wherein said rubbery polymer is natural rubber.

10. The process of claim 5 wherein said rubbery polymer is a synthetic rubbery polymer.

11. The process of claim 5 wherein about 0.10 to 10% of said anhydride is mixed with the rubbery polymer.

12. The process of claim 5 wherein about 5% of the vulcanizing agent is mixed with said rubbery polymer.

13. The process of claim 5 wherein said mixture is heated to about 75 to 150° C.

References Cited by the Examiner

UNITED STATES PATENTS

| | | | |
|---|---|---|---|
| 2,845,403 | 7/1958 | Gunberg | 260—78.4 |
| 2,915,494 | 12/1959 | Snoddon | 260—94.7 |
| 3,033,832 | 5/1962 | Sernuik | 260—78.4 |

OTHER REFERENCES

Organic Reactions, vol. IV, Adams et al., John Wiley & Sons, Inc., 1948, pp. 9 and 10 relied on.

JOSEPH L. SCHOFER, *Primary Examiner.*

JOSEPH R. LIBERMAN, JAMES A. SEIDLECK,
*Examiners.*